Figure 1:
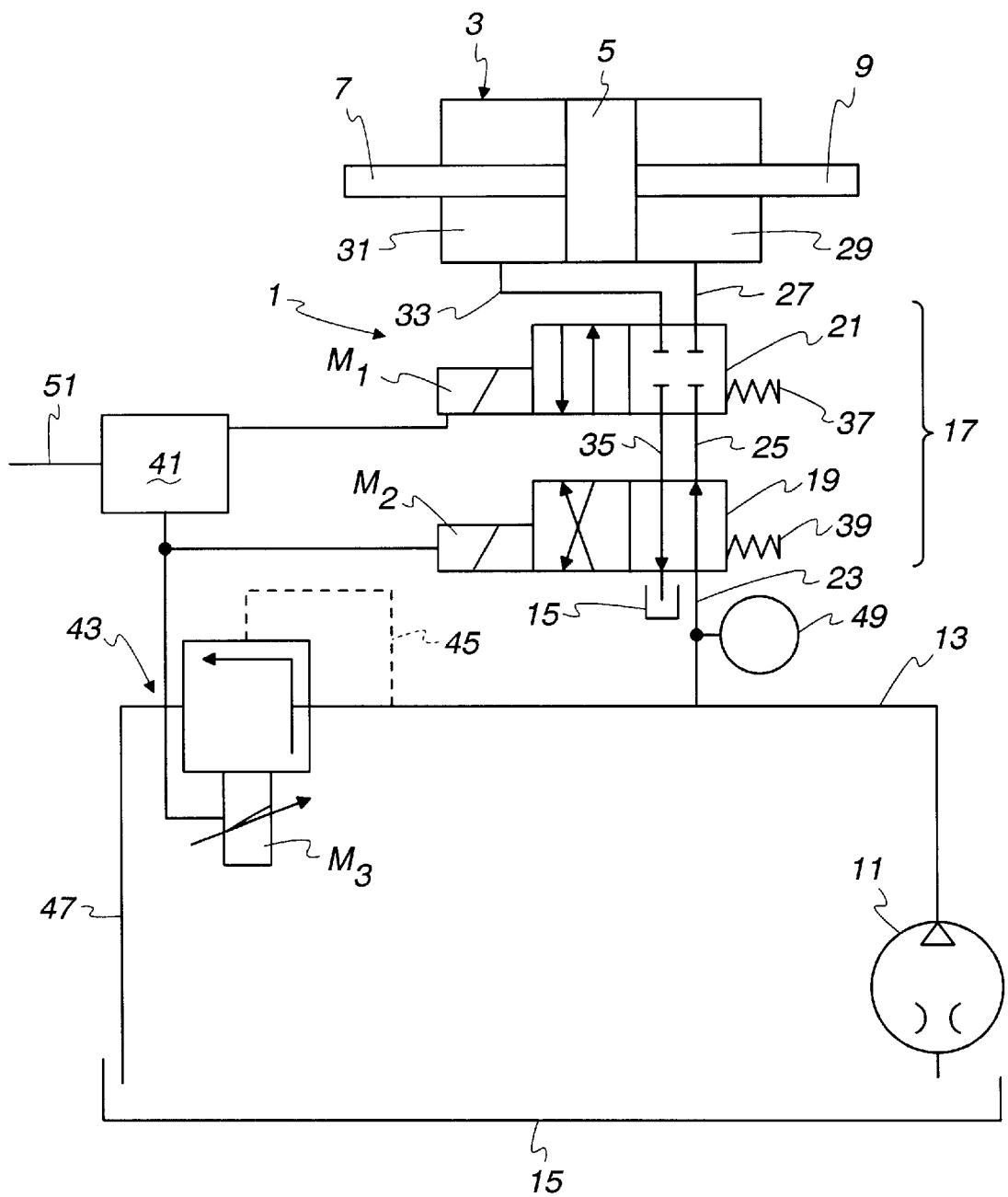

United States Patent [19]
Agner

[11] Patent Number: 6,039,326
[45] Date of Patent: Mar. 21, 2000

[54] DEVICE FOR ROLL STABILIZATION OF A MOTOR VEHICLE

[75] Inventor: Ivo Agner, Bad Homburg, Germany

[73] Assignee: Luk Fahrzeug-Hydraulik GmbH & Co. KG, Bad Homburg, Germany

[21] Appl. No.: 09/043,048

[22] PCT Filed: Jul. 14, 1997

[86] PCT No.: PCT/EP97/03761

§ 371 Date: Jul. 6, 1998

§ 102(e) Date: Jul. 16, 1996

[87] PCT Pub. No.: WO98/02322

PCT Pub. Date: Jan. 22, 1998

[30] Foreign Application Priority Data

Jul. 16, 1996 [DE] Germany ........................... 196 28 612
Jul. 23, 1996 [DE] Germany ........................... 196 29 582

[51] Int. Cl.[7] ............................................. B60G 21/055
[52] U.S. Cl. ................................. 280/5.506; 280/5.507
[58] Field of Search ........................... 280/5.506, 5.507, 280/5.502

[56] References Cited

U.S. PATENT DOCUMENTS

| | | | |
|---|---|---|---|
| 4,765,649 | 8/1988 | Ikemoto et al. | 280/5.506 |
| 4,834,419 | 5/1989 | Kozaki et al. | 280/707 |
| 5,104,143 | 4/1992 | Yonekawa | 280/5.506 |
| 5,547,211 | 8/1996 | Runkel | 280/5.506 |
| 5,642,282 | 6/1997 | Sonehara | 280/5.507 |

FOREIGN PATENT DOCUMENTS

| | | |
|---|---|---|
| 91 04916 | 5/1989 | France . |
| 2675435 | 10/1992 | France . |
| 92 05 781 | 7/1992 | Germany . |
| 43 26 447 | 2/1995 | Germany . |
| 43 27 044 | 2/1995 | Germany . |
| 43 37 765 | 5/1995 | Germany . |
| 195 49 385 | 10/1996 | Germany . |
| 63-097414 | 4/1988 | Japan . |
| 63-134222 | 6/1988 | Japan . |
| 63-188512 | 12/1988 | Japan . |
| 8702468 | 5/1989 | Netherlands . |
| 2 235 168 | 2/1991 | United Kingdom . |

*Primary Examiner*—Kenneth R. Rice
*Attorney, Agent, or Firm*—Fitch, Even, Tabin & Flannery

[57] ABSTRACT

The invention proposes a device for reducing the rolling tendency of a motor vehicle with at least one axle that carries at least two wheels, wherein said axle is provided with a roll stabilizer that includes two stabilizer sections which can be turned relative to one another with the aid of a hydraulic device controlled by an electronic control device, with at least one pump that supplies the hydraulic device, and with a valve unit that cooperates with the hydraulic device and influences the turning direction as well as the coupling of the stabilizer sections. The valve unit contains a changeover valve and a safety valve that can be activated independently of the changeover valve.

28 Claims, 9 Drawing Sheets

DEVICE FOR ROLL STABILIZATION OF A MOTOR VEHICLE

This is a 371 of International Patent Application PCT/US97/03761 filed Jul. 14, 1997.

The invention pertains to a device for reducing the rolling tendency of a motor vehicle with at least one axle that carries two wheels and is provided with a roll stabilizer in accordance with the preamble of claim 1, and a device for reducing the rolling tendency of a motor vehicle with at least two axles that each carry at least two wheels, in accordance with the preamble of claims 7 and 14.

Devices of the aforementioned type are known. They serve for stiffening the suspension of a motor vehicle during a one-sided spring compression and rebound at the wheels assigned to one axle and thusly prevent a torsional vibration of the motor vehicle about its longitudinal axis. Vibrations of this type are also referred to as vehicle or body roll. These known devices-include a hydraulic unit, in particular, an oscillating motor, that cooperates with two stabilizer sections in such a way as to produce mutual torsion. The torques generated in this fashion counteract the spring compression at a wheel connected to the roll stabilizer.

However, it has become apparent that an optimum functional reliability of such devices cannot be ensured at all times.

Consequently, the invention is based on the objective of developing a device of the above-mentioned type for preventing the rolling tendency of a motor vehicle which does not have these disadvantages.

The object of the invention is realized with a device that is realized in accordance with the characteristics disclosed in claim 1. The device is characterized by the fact that the hydraulic device is provided with a valve unit that includes a changeover valve as well as a safety valve that can be actuated independently of the changeover valve. The changeover valve serves for controlling the hydraulic device in such a way that opposite torques can also be introduced into the sections of the roll stabilizer in rapid sequence. The safety valve serves for switching the hydraulic device into a defined functional state if the control device assigned to the hydraulic device fails. It was determined that it is possible for the changeover valve to become jammed, e.g., due to contamination of the hydraulic fluid. Since the hydraulic device contains a changeover valve and a safety valve which operate independently of each other, a functional failure of the changeover valve cannot influence the reliability of the device for reducing the rolling tendency because a separate, independent safety valve is provided.

One preferred embodiment of the invention is characterized by the fact that the safety valve represents the last functional element in the hydraulic supply of the hydraulic device. Several functional elements are usually arranged between the hydraulic unit and the pump that supplies the hydraulic unit, e.g., devices for measuring and influencing the hydraulic flow and the pressure. Defects in one or more of these systems can lead to persistent safety risks. If the safety valve is arranged directly in front of the hydraulic device, all defects occurring between the pump and the safety valve can be bypassed.

Additional embodiments of the invention are disclosed in the remaining subordinate claims.

The object of the invention is also realized with a device for reducing the rolling tendency of a motor vehicle with at least two axles that respectively carry at least two wheels, wherein roll stabilizers and hydraulic devices are assigned to the axles. This pertains, in particular, to passenger cars that are equipped with a device of this type. The device is characterized by the fact that the hydraulic devices of both axles are provided with valve units that contain separate changeover and safety valves which operate independently. This means that the previously discussed advantages are also realized in this case.

Additional embodiments are disclosed in the remaining subordinate claims.

The object of the invention is also realized with a device for reducing the rolling tendency of a motor vehicle with at least two axles which also contains a flow divider that divides the oil flow delivered to the hydraulic devices of the axles by the pump. This device is characterized by the fact that the pump is realized in the form of a pump with a limited volume flow, i.e., the maximum hydraulic flow to be conveyed by the pump is limited. A flow divider that comprises a flow regulator cooperates with this pump. This flow regulator is designed in such a way that one of the hydraulic devices is initially supplied with a preferably nearly constant flow of hydraulic oil until the flow regulator responds and releases the hydraulic connection between the pump and the second hydraulic device. A flow divider that is realized in this fashion is very insensitive to vibrations. Known flow dividers are realized in the form of classic flow dividers, i.e., they contain two control edges, one of which serves for supplying one hydraulic unit, and the other of which serves for supplying the second hydraulic unit. The hydraulic flow delivered by the pump is always controlled by the control edge that is assigned to the hydraulic device with the lower pressure. If the pressures of both hydraulic devices are approximately equal, uncontrolled control edge changes occur due to valve hysteresis. This mutual influencing of both fluid flows makes the flow divider vibration- and tolerance-sensitive. Vibration and tolerance problems can be significantly reduced with the proposed arrangement, namely the combination of a pump with limited volume flow and a flow regulator.

One particularly preferred embodiment of the device is characterized by the fact that a first pressure regulator is assigned to the flow path of the first hydraulic device, and by the fact that a second pressure regulator is assigned to the flow path of the second hydraulic device. In this way, the desired pressure in both flow paths can be adjusted independently.

One preferred embodiment of the device is characterized by the fact that the first and the second pressure regulator are coupled via the flow regulator, and by the fact that the flow regulator is provided with a pressure pilot that preferably operates mechanically and functions like a pressure relief valve. If one pressure regulator fails, the other pressure regulator is charged with the pressure of both flow paths and practically acts as a pressure limiting valve due to the coupling of both pressure regulators. Consequently, an additional precaution against sudden pressure peaks and excessively high pressure values in the hydraulic system can be attained. In this case, it is possible to integrate the pressure pilot into the flow regulator so as to attain a very compact structural shape.

Figure 2:
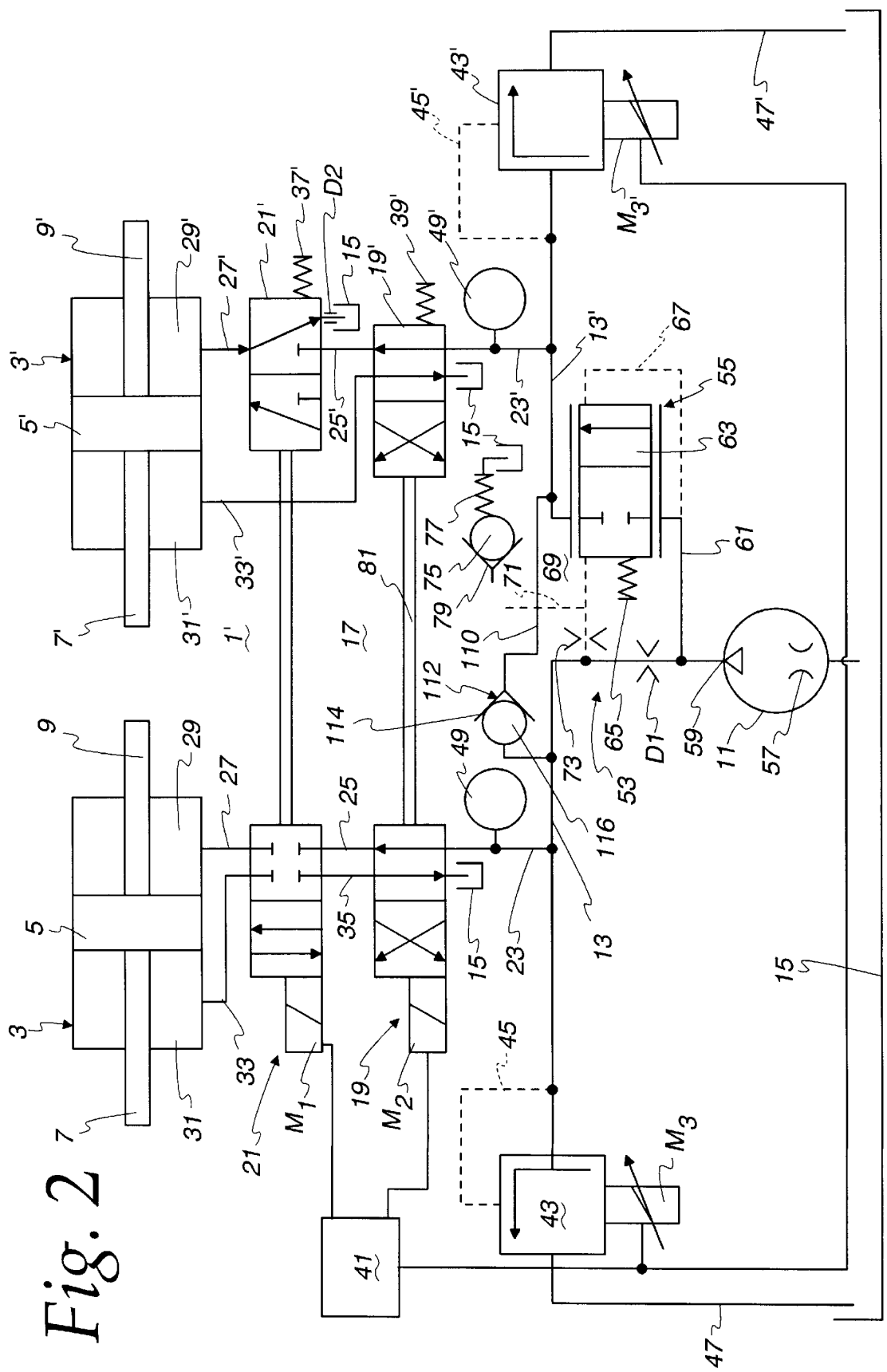
Figure 3:
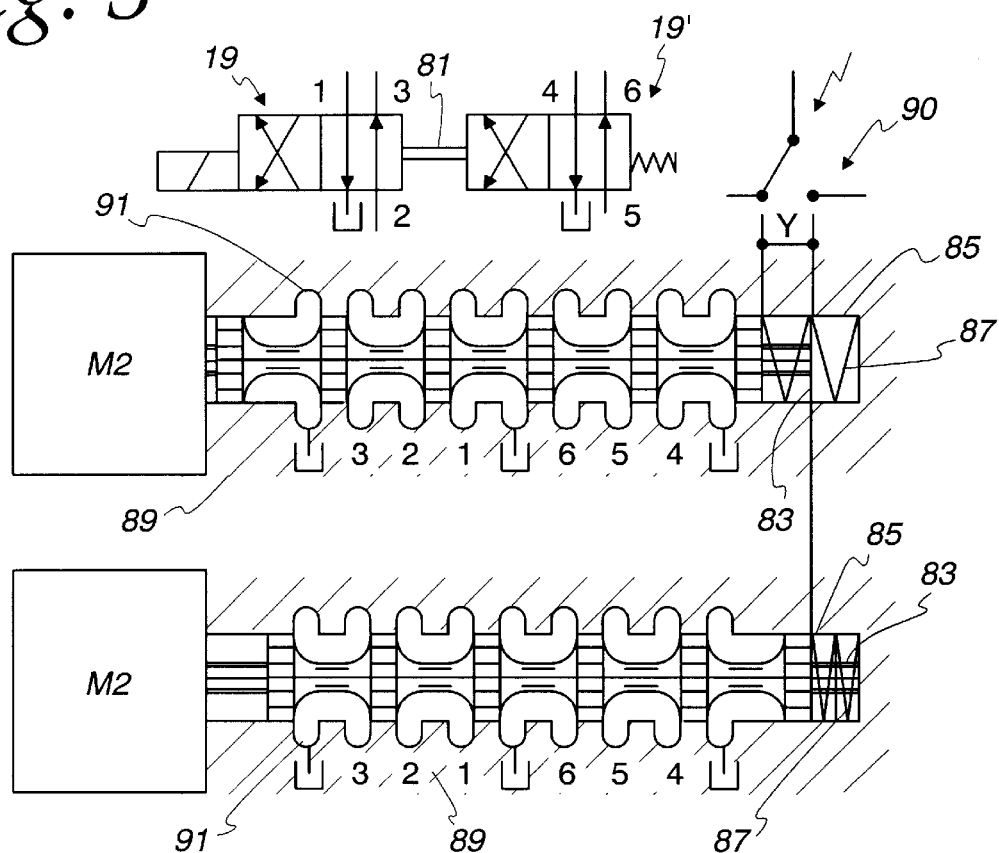
Figure 4:
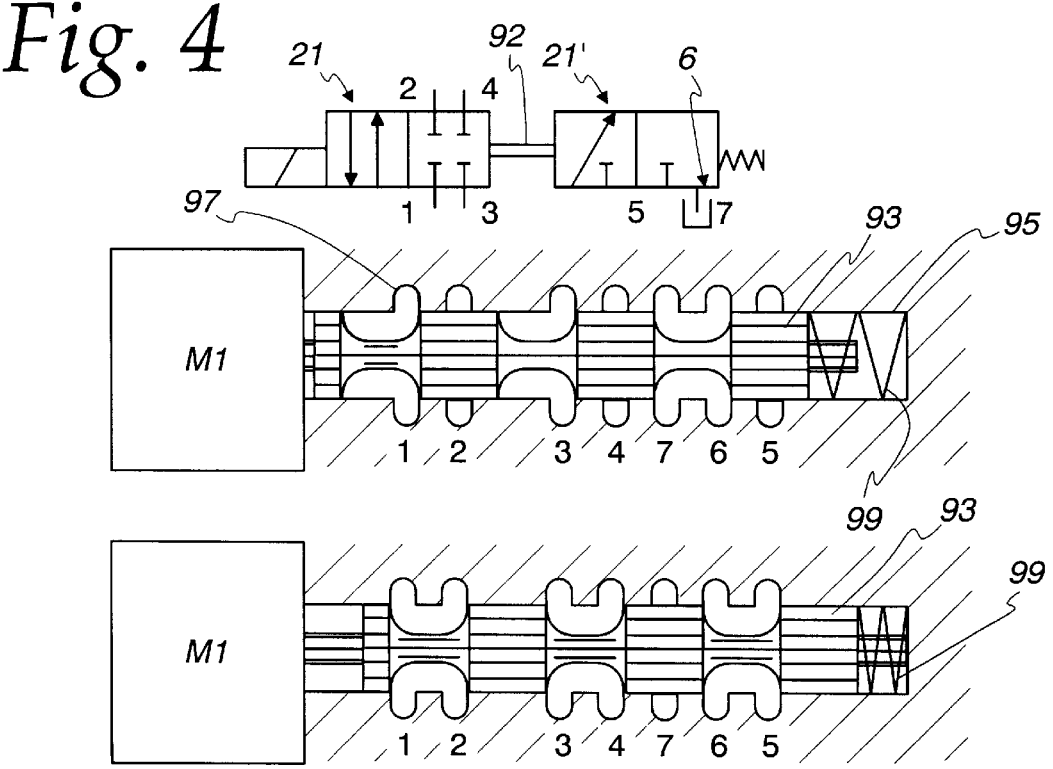
Figure 5:
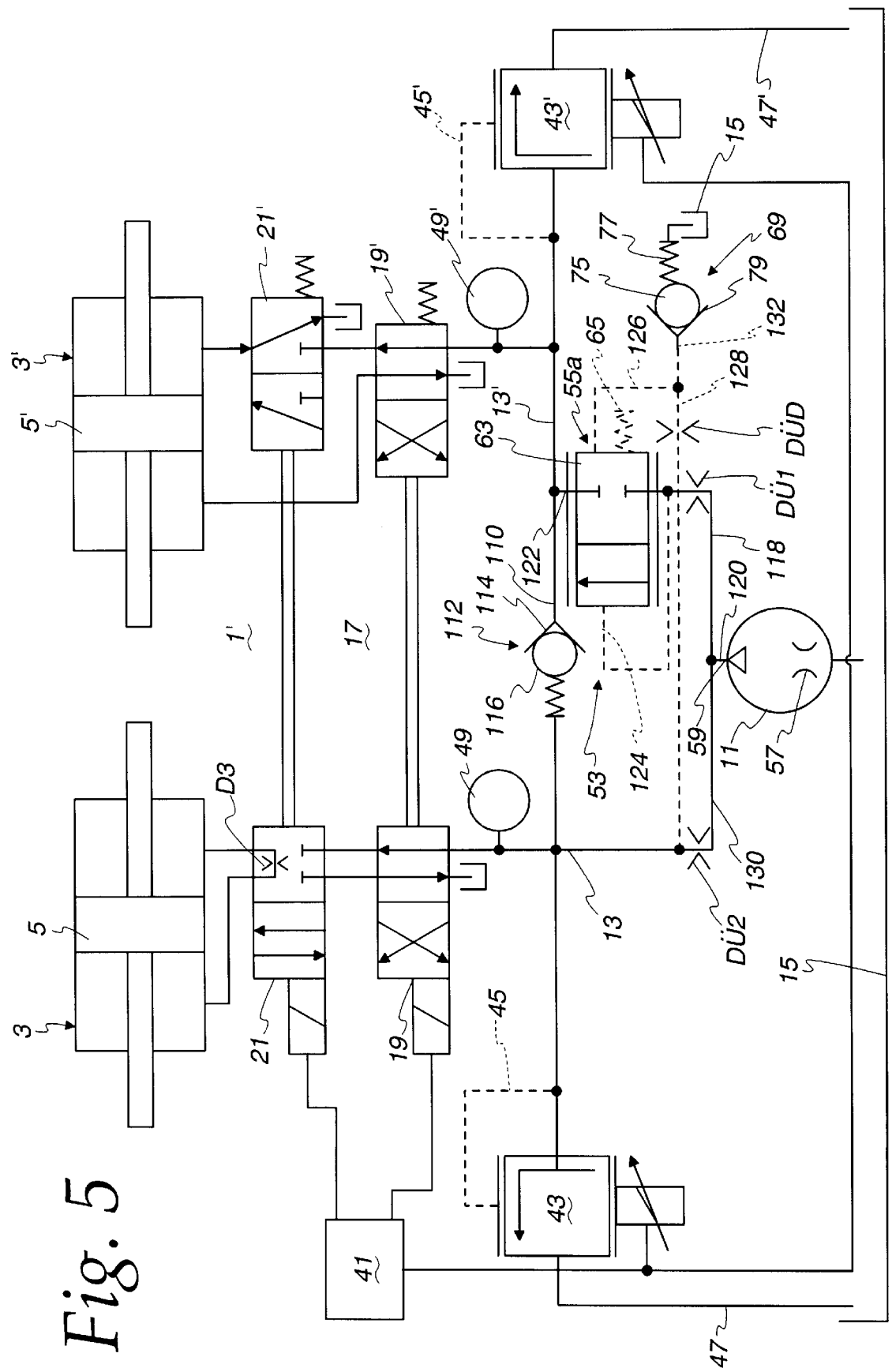
Figure 6:
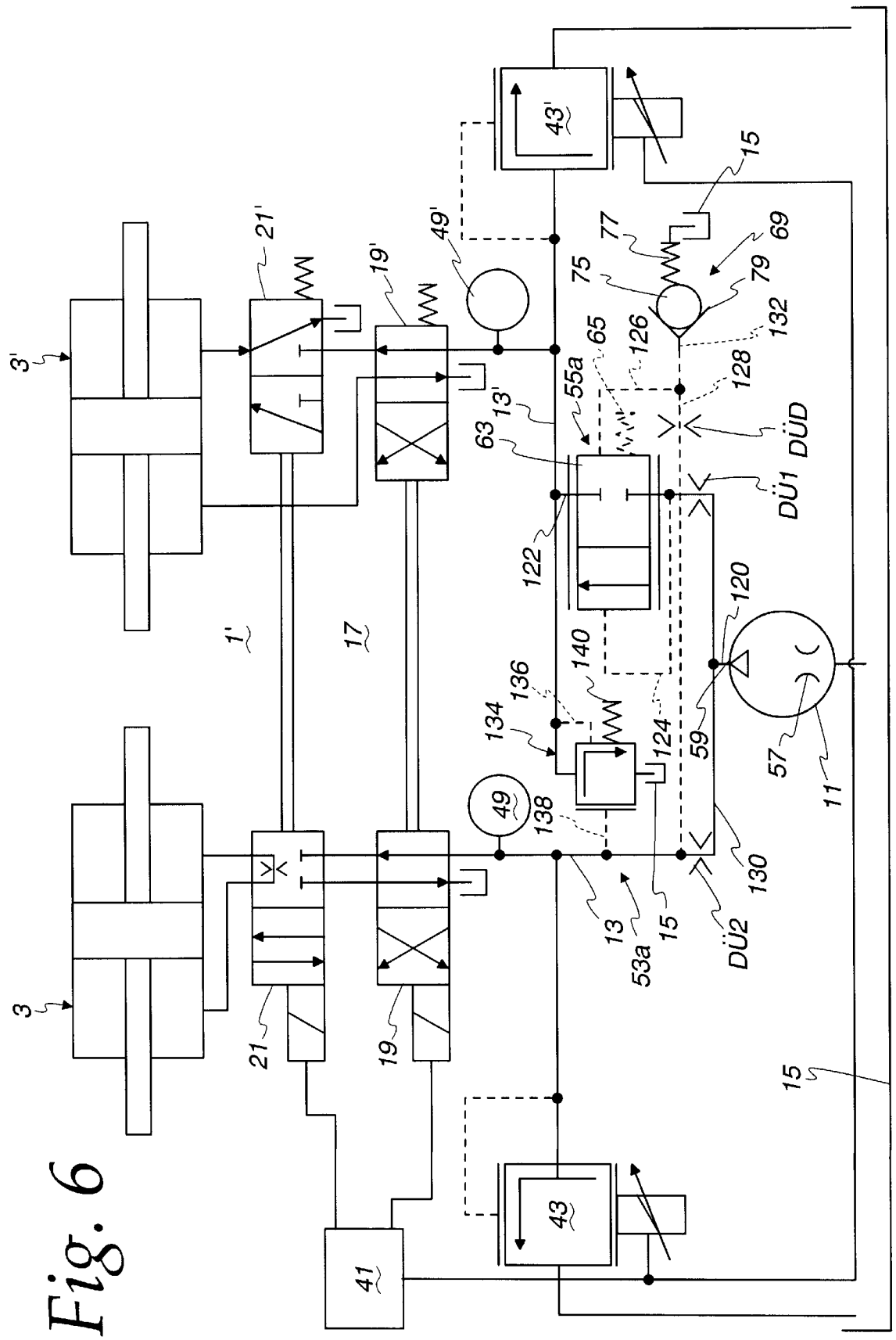
Figure 7:
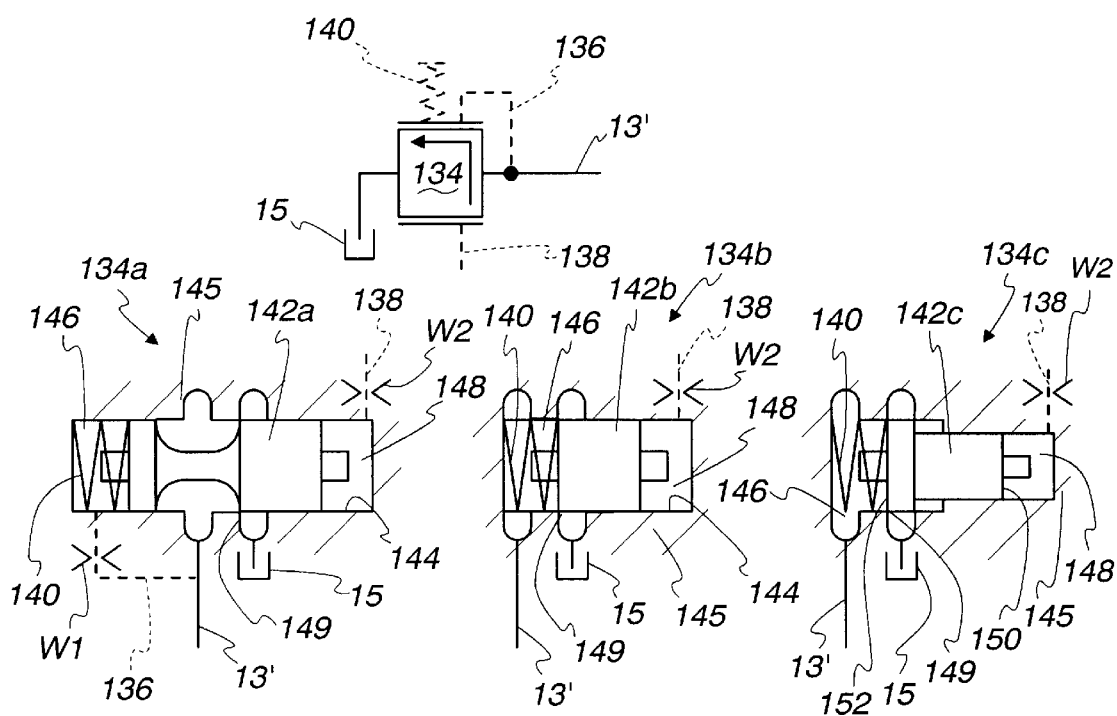
Figure 8:
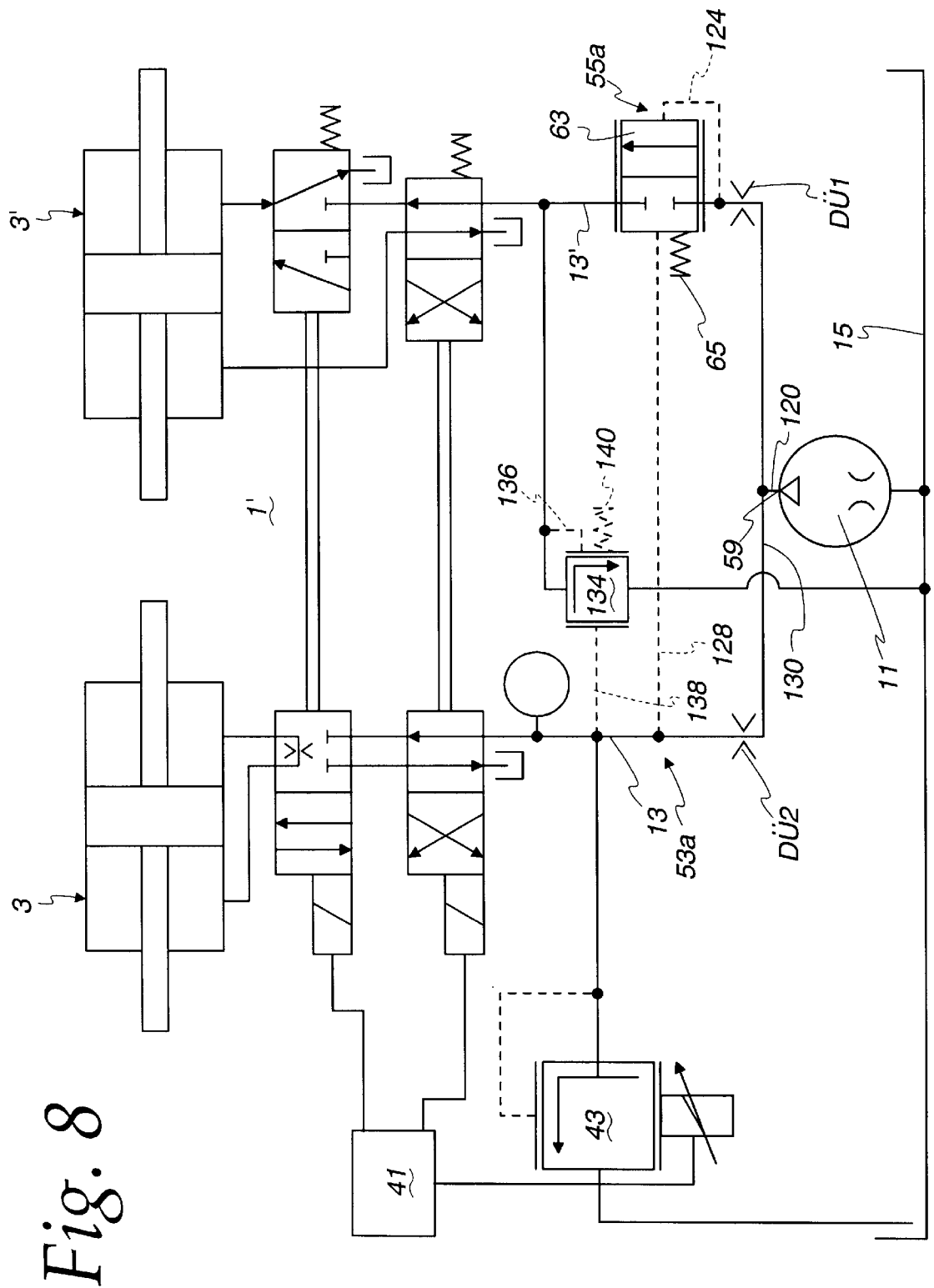
Figure 9:
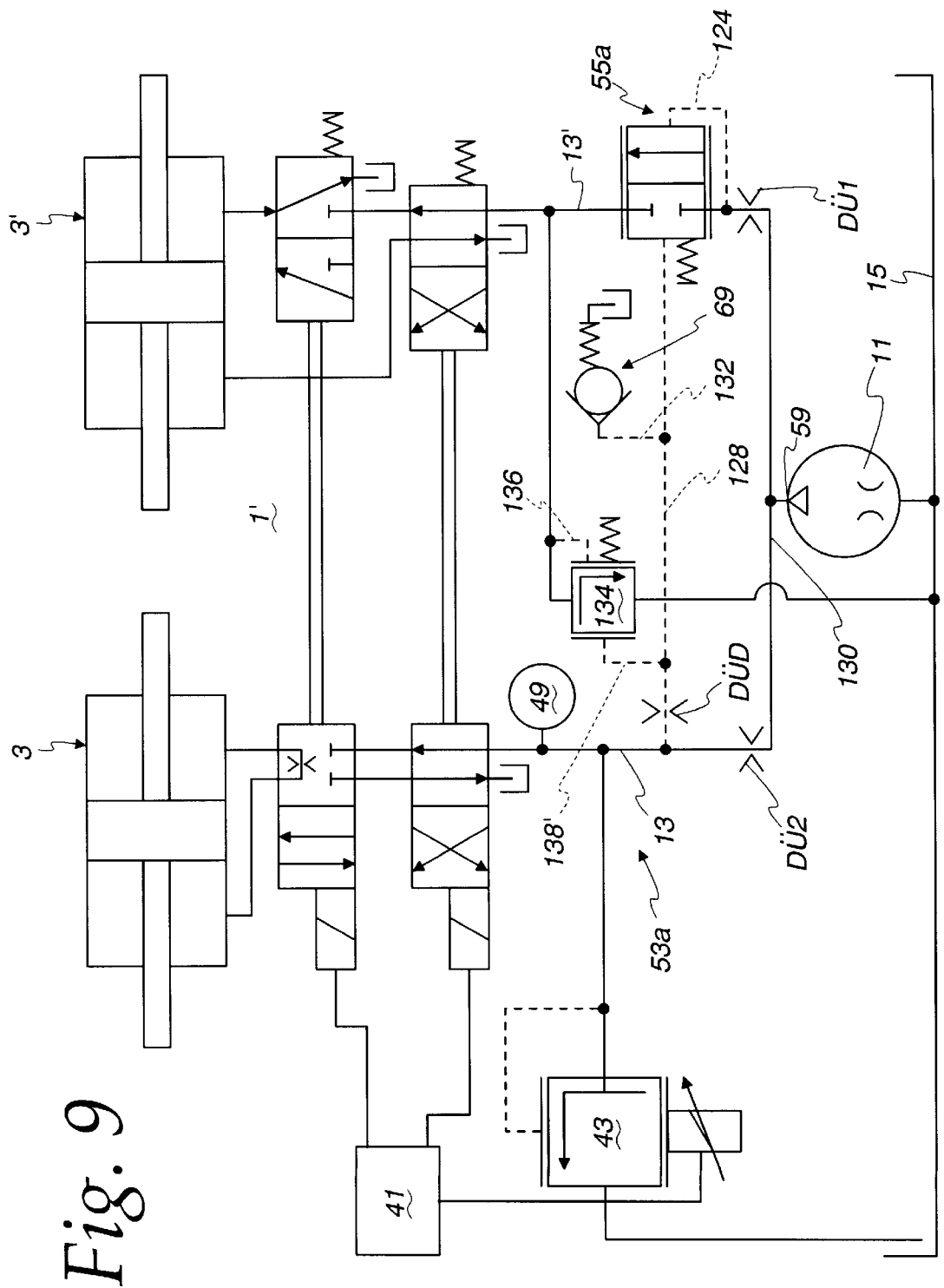
Figure 10:
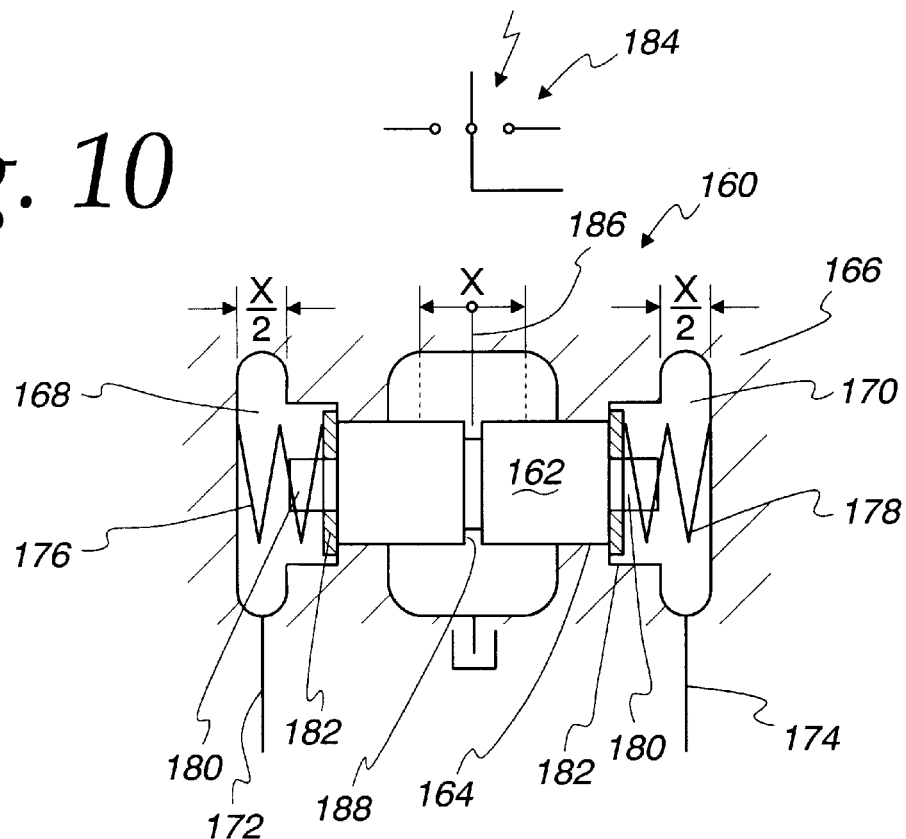
Figure 11:
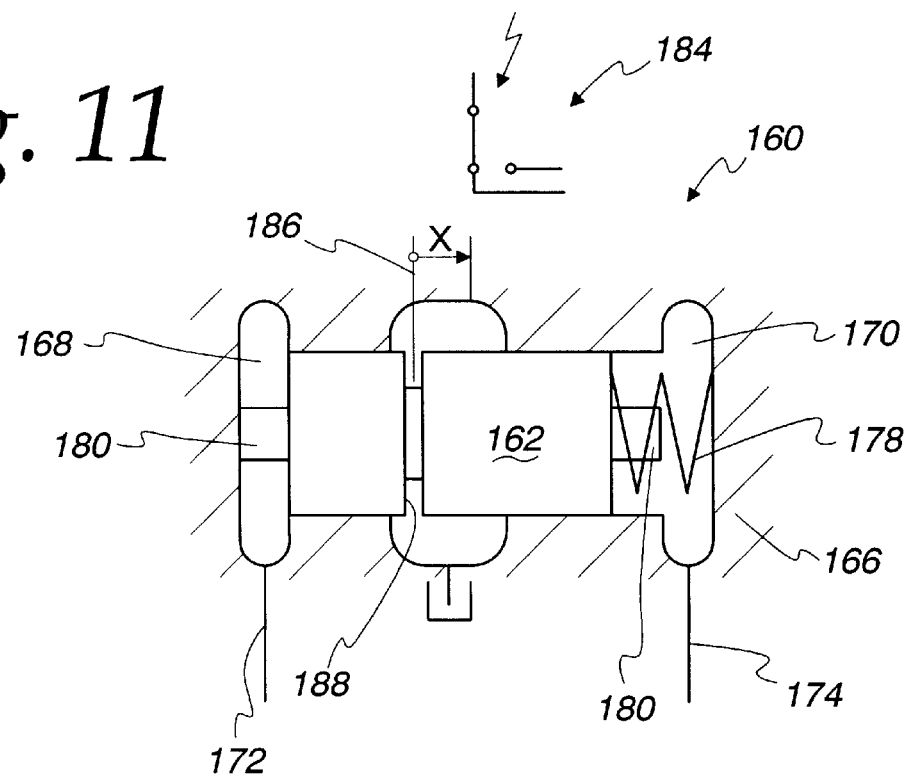

The invention is described in detail below with reference to the figures. The figures show:

FIG. 1, a hydraulic diagram of a device for reducing the rolling tendency of a motor vehicle with one axle that carries at least two wheels;

FIG. 2, a hydraulic diagram of a device for reducing the rolling tendency of a motor vehicle with at least two axles that each carry at least two wheels;

FIG. 3, a basic diagram of a changeover valve;

FIG. 4, a basic diagram of a safety valve;

FIGS. 5 and 6 a hydraulic diagram of additional embodiments of the invention for reducing the rolling tendency of a motor vehicle according to FIG. 2;

FIG. 7, a basic diagram of several embodiments of a pressure regulator;

FIGS. 8 and 9 a hydraulic diagram of additional embodiments of the invention for reducing the rolling tendency of a motor vehicle;

FIG. 10, a basic diagram of a sensor device, and FIG. 11, a basic diagram of an additional embodiment of the sensor device.

The device for reducing the rolling tendency of a motor vehicle which is described below and also referred to as an active roll stabilizer can be utilized in all types of motor vehicles that contain at least one axle that carries two wheels. Consequently, it would be conceivable to utilize the device in so-called "trikes."

FIG. 1 shows a hydraulic diagram of a device for motor vehicles with only one axle. FIG. 2 shows a hydraulic diagram for a motor vehicle with two axles.

The device 1 shown in FIG. 1 contatains a hydraulic device 3 that, for example, is provided with an oscillating motor. In this figure, the oscillating motor is symbolically indicated by a double-acting cylinder with a reciprocating piston 5 that is connected to control rods 7 and 9 of not shown stabilizer sections of a roll stabilizer. These sections form part of a roll stabilizer that is essentially realized in U-shaped fashion, wherein the arms of the roll stabilizer are coupled to the ends of the axle or the suspension of the wheels assigned to the axle, respectively. The U-shaped base of the roll stabilizer is divided. The ends are connected to one another via the hydraulic 14 device. The hydraulic device is conventionally realized in such a way that the stabilizer sections can be turned relative to one another, i.e., torques are generated in the roll stabilizer. These torques influence the spring compression and the rebound at the wheels.

The hydraulic device 3 is supplied with hydraulic fluid by a pump 11 via suitable hydraulic lines 13. This hydraulic fluid is conveyed from a tank 15 that is represented in this figure only. The pump 11 is realized in the form of a pump with throttled suction, wherein the throttle is situated on the suction side of the pump. A nearly constant volume flow may, however, also be attained by controlling the volume flow of a fixed displacement pump or a variable displacement pump on the hydraulic side or by influencing the pump drive. The hydraulic fluid is delivered to the hydraulic device 3 via a valve unit 17 that contains a changeover valve 19 and a safety valve 21. The changeover valve 19 is realized in the form of a 4/2 directional control valve. A first line section 23 leads to a first pressure chamber 29 of the hydraulic device 3 via a second line section 25 and a third line section 27. A fourth line section 33 leads from a second pressure chamber 31 to a fifth line section 35 via the safety valve 21, wherein the fifth line section leads to the tank 15 via the changeover valve 19.

The valves of the valve unit 17 are realized in the form of electromagnetically actuated valves that have a preferred position. The safety valve 21 is provided with a spring 37 that presses the schematically indicated control piston of the safety valve toward the left against the force of a magnetic device M1. Accordingly, the changeover valve 19 is provided with a magnetic device M2 that acts against a spring 39. This spring presses the schematically indicated control piston of the changeover valve toward the left into a preferred functional position. The functional positions of the changeover valve and the safety valve shown in this figure are assumed in the deactivated or currentless state of the magnetic devices M1 and M2. FIG. 1 indicates that the first line section 23 is connected to the second line section 25 and the fifth line section 35 is connected to the tank 15 in this position. The safety valve 21 is designed in such a way that the connection between the second line section 25 and the third line section 27 as well as the connection between the fourth line section 33 and the fifth line section 35 is blocked in the currentless state. During the operation of the device 1, the magnetic device M1 of the safety valve 21 is activated such that the control piston of the safety valve is displaced toward the right against the force of the spring 37, i.e., a hydraulic connection between the line sections 25 and 27 as well as the line sections 33 and 35 is produced as indicated by the arrows. During the proper operation of the device, this hydraulic connection is produced continuously.

If the safety valve 21 triggered by the magnetic device M1 responds during the normal operation, a hydraulic connection between the pump 11 and the first pressure chamber 29 is produced via the hydraulic line 13 and the line sections 23, 25 and 27. A hydraulic connection between the second pressure chamber 31 and the tank 15 is simultaneously produced via the line sections 33 and 35.

If the changeover valve 19 is triggered by the magnetic device M2, the control piston of the changeover valve moves toward the right against the force of the spring 39 such that the first line section 23 is connected to the fifth line section 35 as indicated by intersecting arrows, and the second line section 25 is connected to the tank 15. The direction in which the piston 5 is charged with pressure is reversed in this fashion. In this case, the second pressure chamber 31 located opposite the first pressure chamber 29 is charged with the hydraulic oil delivered by the pump 11. The piston 5 moves to the right or left depending on which pressure chamber 29 or 31 is charged with pressure. Opposite moments are introduced into the stabilizer sections of the roll stabilizer due to the reciprocating movement of the piston 5.

The magnetic devices M1 and M2 are controlled by a control device 41 that is represented in this figure only.

A pressure regulator 43 that is realized in the form of a proportional pressure limiting valve and that can be continuously adjusted via the pressure in the hydraulic line 13 is integrated into the hydraulic line 13. The pressure regulator contains a magnetic device M3 that acts against the pressure applied to the control piston via a control line 45 and delivers hydraulic oil to the tank 15 via a relief line 47 at an adjustable overpressure.

The magnetic device M3 can be controlled by the control device 41 via a suitable control line.

FIG. 1 also shows a pressure sensor 49 that measures the pressure generated by the pump 11. In this figure, the sensor is, for example, arranged in the first line section 23. This sensor is connected to the control device 41 via a not shown electric line, wherein the control device receives the output signals of the sensor and evaluates said output signals in order to control the valves, e.g., the safety valve 21.

FIG. 1 also shows that a signal line 51 leads to the control device 41. This signal line serves for the input of signals that, for example, represent the roll position and the speed of the motor vehicle. Torque is introduced into the stabilizer sections via the hydraulic device 3 based on these signals. The torque depends on the respective spring compression at the wheels. It may be required to introduce opposite torques in rapid sequence, wherein said torques can be realized by changing over the pressures in the pressure chambers 29 and 31. The reversal of the pressures is realized with the aid of the changeover valve 19 that is triggered by the control device 41. This means that moments which counteract the rolling of the motor vehicle can be introduced into the stabilizer sections by correspondingly activating the changeover valve 19.

FIG. 2 shows a hydraulic diagram of a device for reducing the rolling tendency of a motor vehicle with two axles. According to this figure, the components described previously with reference to FIG. 1 are analogously provided on the left side. The device 1 is, for example, realized in such a way that the components described previously with reference to FIG. 1 are assigned to the front axle of the not shown motor vehicle. A second hydraulic device 3' that is designed nearly identically to the hydraulic device 3 described previously with reference to FIG. 1 and assigned to the rear axle contain a piston 5' and control rods 7' and 9'. The hydraulic device 3' may also contain an oscillating motor as described previously with reference to the hydraulic device 3 according to FIG. 1. In this case, the oscillating motor is illustrated in the form of a double-acting cylinder so as to clarify the function of the device 1'. The first pressure chamber 29' is connected to the tank 15 via a third line section 27' and the safety valve 21' in the functional position shown in this figure. The second pressure chamber 31' is also connected to the tank 15 via a line section 33' and the changeover valve 19'. In the currentless state of the valve unit 17 shown in this figure, both pressure chambers 29' and 31' of the hydraulic device 3' are connected to the tank, i.e., no moments can be introduced into the stabilizer sections.

In the functional position shown, the line section 23' that is connected to the line section 251 via the changeover valve 19' is closed by the safety valve 21'. The hydraulic connection between the pump 11 and the hydraulic device 3' is also interrupted in the functional position of the valve unit 17 shown in this figure.

FIG. 2 shows the valve unit 17, i.e., the safety valve 21' and the changeover valve 19', in the deactivated state that, for example, occurs during a power loss or if the control device 41 detects a malfunction and the power supply of the valve unit is cut off.

During normal operation, the control piston of the safety valve 21' is moved toward the right against the force of the spring 37' such that the line section 25' is connected to the line section 27'. In this functional position, the changeover valve 19' is fully functional. In the activated state of the valve unit, the hydraulic line 13' is connected to the first pressure chamber 29' of the hydraulic device 3' via the line section 23', the changeover valve 19', the line section 25', the safety valve 21' and the line section 27'. The second pressure chamber 31' is simultaneously connected to the tank 15 via the line section 33' and the changeover valve 19'. This means that the pressure in the hydraulic line 13' moves the piston 5' toward the left because the left pressure chamber 31' is relieved.

During the activation of the changeover valve 19, the second pressure chamber 31' is charged with pressure via the line section 23', the changeover valve 19' and the line section 33' if the hydraulic line 13' is pressurized. The first pressure chamber 29' is simultaneously connected to the tank 15 via the line section 27', the safety valve 21', the line section 25' and the changeover valve 19', i.e., the first pressure chamber is relieved of pressure. If the changeover valve 19 becomes jammed in this position, i.e., in its right end position, and is no longer able properly to perform its function, the pressure in the pressure chamber 31' and the line section 33' can be relieved via the pressure regulator 43'.

FIG. 2 shows that the safety valves 21 and 21' as well as the changeover valves 19 and 19' of the valve unit 17 are rigidly coupled by a rod 81. In this case, the rod 81 merely serves for elucidating the coupling of the changeover valves. Consequently, the activation and deactivation of the safety valves—as well as the changeover valves—respectively take place simultaneously. However, the safety and changeover valves of the valve unit 17 are completely mechanically decoupled. The very frequent changeover functions of the changeover valve which could lead to wear do not influence the safety valve at all. Naturally, this also applies to the device shown in FIG. 1. Consequently, malfunctions of the changeover valve 19, 19' can also be bypassed by the safety valve 21, 21'. In this respect, it is particularly advantageous that a malfunction of the safety valve 21, 21' cannot lead to critical driving conditions.

FIG. 2 also shows that a pressure sensor 49' is provided in the line section 23' analogously to the left portion of the device 1' shown in FIG. 2. This pressure sensor is connected to the control device 41 via a not shown line.

A pressure regulator $_{43}$' that contains a magnetic device M3' is also arranged in the hydraulic line 13' in this case. This magnetic device acts against the pressure in the hydraulic line 13' which is applied to the pressure regulator 43' via the control line 45'.

The elements shown in the left portion of FIG. 2, the hydraulic device 3, the safety valve 21 and the changeover valve 19 of the valve unit 17 are assigned to the front axle. These elements are designed identically to the device described previously with reference to FIG. 1, i.e., a detailed description of their design is not provided. Identical components are identified by identical reference symbols. Accordingly, reference symbols provided with a ' symbol are assigned to the rear axle that is illustrated in the right portion of FIG. 2.

The hydraulic diagram according to FIG. 2 shows that the hydraulic devices 3 and 3' of the front and rear axles are supplied with hydraulic fluid by only one pump 11. A flow divider 53 that contains a flow regulator 55 is provided so as to convey the fluid flow delivered by the pump to the front and rear axle or the corresponding hydraulic devices 3 and 3', respectively. The flow regulator 55 is equipped with a pressure relief valve 69 that is referred to as a pressure pilot and connected to the hydraulic line 13 and consequently the pressure outlet 59 of the pump 11 via a control line 71 and a throttle 73. Pressure pilots of this type are generally known. For example, such pressure pilots contain a ball 75 that is pressed against a valve seat 79 by a spring 77. At an overpressure that lies above the value defined by the spring 77, the ball 75 is lifted off the valve seat 79 such that oil is able to flow into the tank 15. The pump 11 is provided with a suction throttle 57 that maintains the fluid flow conveyed out of the tank 15 at a maximum value that can be predetermined.

In this case, the hydraulic line 13 is connected to the pressure outlet 59 of the pump 11 via a throttle D1. A line section 61 leads directly from the pressure outlet 59 to the flow regulator 55, the control piston 63 of which is charged with the force of a spring 65 and the pressure in the control line 71 on one side and the pressure at the pressure outlet 59 on the other side via a control line 67. In the unpressurized state, the control piston 63 separates the line section 61 from the hydraulic line 13' that serves for supplying the rear axle.

Once the pump 11 is activated, the control piston 63 is displaced toward the left into the control position by the pressure applied via the control line 67 via the force of the spring 65 and the pressure in the control line 71. Due to this displacement of the control piston 63, a fluid connection between the pressure outlet 59 of the pump 11 and the hydraulic line 13' is produced via the line section 61 and the flow regulator 55, i.e., the pressure chambers 29' and 31' of the hydraulic device 3' can be alternately charged with pressure as a function of the position of the changeover valve 19'.

When the motor vehicle is driven, the pump 11 preferably conveys a constant flow volume. It is preferred that the flow regulator 55 primarily provides a constant flow volume for the hydraulic device 3, i.e., for the front axle.

The pressure regulators 43 and 43' are designed in such a way that pressures between approximately 0 and 200 bar can be adjusted via the control device 41. In this case, it is ensured that the pressure delivered to the front axle that is also delivered to the hydraulic device 3 is greater than or at least equal to the pressure applied to the hydraulic device 3' for the rear axle.

The hydraulic diagram according to FIG. 2 indicates that the hydraulic device 3 for the front axle and the hydraulic device 3' for the rear axle are assigned separate pressure regulators 43 and 43'. These pressure regulators are hydraulically connected to the respective hydraulic lines 13 and 13' and controlled by the control device 41. In addition, these pressure regulators make it possible for hydraulic oil to flow into the tank 15 via-relief lines 47 and/or 47' if the predetermined pressure is exceeded.

In this case, the pressure regulators 43 and 43' are coupled in such a way that if one of the pressure regulators fails, the other pressure regulator serves as a pressure limiting valve for the entire system, i.e., for the other hydraulic line also. In the device 1' shown in FIG. 2, this coupling is realized by means of the flow divider 53 or the flow regulator 55 in cooperation with the pressure relief valve 69 that is referred to as the pressure pilot. The function of this coupling is described below:

After the pump 11 is started up, the connection between the line section 61 and the hydraulic line 13' for the rear axle is initially interrupted by the flow regulator 55 and its piston 63, respectively. Consequently, the hydraulic oil conveyed by the pump is fed to the hydraulic device 3 via the hydraulic line 13. As the differential pressure in the hydraulic system increases at the throttle Dl, the flow regulator 55 ultimately responds such that the control piston 63 releases the hydraulic connection with the hydraulic line 13'. The second pressure regulator 431 is thus supplied with oil. Both pressure regulators 43 and 43' are adjusted in such a way that the pressure for the front axle is greater than or equal to that for the rear axle. For example, if the pressure regulator 43' fails and the pressure in the hydraulic system assigned to the rear axle increases due to a malfunction, the pressure in the line section 61 that is connected to the first pressure regulator 43 via the line 13 also increases. The pressure regulator 43 is now able to respond and relieve an overpressure via the relief line 47. The previous explanation indicates that the part of the hydraulic system which is assigned to the rear axle or the hydraulic device 3' is, in case of a malfunction, co-monitored by the pressure regulator 43 that in principle is assigned to the front axle or the hydraulic device 3.

If the pressure regulator 43 of the hydraulic device 3 fails, an overpressure caused by a malfunction is also transmitted to the hydraulic line 13' via the line section 61 and can be detected by the second pressure regulator 43'. This second pressure regulator is able to decrease this overpressure and discharge hydraulic oil via the relief line 47' because the flow regulator is equipped with the pressure relief valve 69 that is connected to the hydraulic line 13 and consequently the pressure outlet 59 of the pump 11 via the control line 71 and the throttle 73. The pressure in the control line 71 during a malfunction of the hydraulic device 3 is maintained at a lower level than that in the control line 67 which corresponds to the pump pressure by means of the throttles D1 and 73. This means that the flow regulator 55 is enabled and a connection between the line 61 and the hydraulic line 13' is produced.

FIG. 2 also illustrates another feature: the safety valves 21 and 21' are arranged in the immediate vicinity of the hydraulic device 3 and 31, respectively, analogously to the embodiment according to FIG. 1. Malfunctions in the remaining components indicated in the hydraulic diagrams according to FIGS. 1 and 2 lead to undefined conditions that can be bypassed by the safety valve 21 or 21', respectively. This means that a fail-safe function is realized with the aid of the safety valves 21, 21'.

In the embodiment according to FIG. 1 and in the part of the device 1' which is assigned to the front axle, the piston 5 of the hydraulic device 3 is hydraulically fixed. This is realized by displacing the safety valve 21 into the position shown in FIGS. 1 and 2 such that the line sections 33 and 27 are separated from the remaining system. Since hydraulic flow is no longer possible in this case, the hydraulic device 3 acts as a rigid coupling of the corresponding stabilizer sections.

With respect to the rear axle, the safety valve 21' is displaced into the position shown in FIG. 2 in case of a malfunction. This is realized by means of the spring 371 that displaces the control piston of the safety valves 21 and 21' toward the left. Consequently, both sides of the hydraulic device 3' are connected to the tank 15—in the currentless position of the changeover valve 19' shown in FIG. 2. This means that both pressure chambers 29' and 31' are separated from the pump 11 and unpressurized. It would be conceivable to realize the piston 5' in freely movable fashion, i.e., decoupled from the hydraulic device 3'. However, it is also possible to incorporate at least one hydraulic throttle that prevents the free discharge of the hydraulic fluid from the pressure chambers, thereby producing a damping effect. Such a throttle is indicated in FIG. 2 by reference designator D2. The stabilizer sections assigned to the hydraulic device 3' are not rigidly coupled together, nor are they entirely decoupled. Consequently, it is still possible to transmit torques from one stabilizer section to the other stabilizer section via the hydraulic device 3' such that a residual function of the roll stabilizer is ensured. However, torques are no longer actively introduced into the roll stabilizer and its sections, respectively. A complete decoupling of the roll stabilizer can be realized by omitting the throttle D2.

In FIG. 1, a rigid coupling is provided in case of a malfunction due to the safety valve 21 since the line sections 27 and 33 are closed. In this respect, it would, however, also be conceivable to provide a complete decoupling or a damped decoupling as described previously with reference to FIG. 2.

In both instances, it is ensured that the safety valve operates independently of the changeover valve due to the separate arrangement of both valves, i.e., a very high reliability is attained.

This decoupled arrangement of both valves is also provided in the valve unit 17 according to FIG. 2. In this case although the safety valves 21 and 21' are rigidly coupled together, and the changeover valves 19 and 19' are rigidly coupled together, the safety valves and the changeover valves are arranged completely separately and function independently. This means that frequent changeover processes do not influence the separate safety valve, i.e., a high safety standard is attained.

In the device 1' according to FIG. 2, the flow divider 53 has little vibration and tolerance problems due to the flow regulator that is provided with the pressure pilot. This also provides a contribution to the reliability of the device. In addition, the pressure regulators 43 and 43' assigned to the rear and front axle are coupled in such a way that in case of a malfunction if one pressure regulator fails, the other pressure regulator is still able to protect the entire system from excessively high pressures.

In the embodiment of the device 1' shown in FIG. 2, a hydraulic line 110 with a valve unit 112 is provided. The hydraulic line 110 serves for producing a hydraulic connection between the pressure levels of the hydraulic devices 3 and 3'. This means that the hydraulic line 110 bypasses the flow divider 53. For this purpose, the hydraulic line 110 is connected to the hydraulic lines 13 and 13' which supply the hydraulic devices 3 and 3' with an oil flow and the pressure level of which hydraulic lines is identical to the pressure level in the assigned pressure regulators 43 and 43', respectively. The valve unit 112 is preferably realized in the form of a mechanical return valve that comprises a valve seat 114 into which a ball 116 is pressed. Valve units of this type have a simple design and function reliably. The valve unit 112 connects the pressure levels of both hydraulic devices 3, 3', preferably in instances in which the pressure in the hydraulic device 3 is lower than the pressure in the hydraulic device 3'. Consequently, the valve unit that is realized in the form of a return valve represents a control device that compares the two pressure levels to one another and automatically carries out a pressure regulation. In the position of the valve unit 112 shown in FIG. 2, this measure always ensures that the pressure level of the hydraulic device 3 at least corresponds to or is higher than the pressure of the hydraulic device 3'. The previous explanations make it clear that the valve unit makes it possible to compensate for the manufacturing and adjustment tolerances of the individual components, e.g., the pressure regulators 43, 43', the pump 11 and the flow divider. This compensation influences the pressure level, wherein improper adjustments of the pressure regulator are compensated for by the fluid connection.

FIG. 3 shows a schematic diagram of a changeover valve together with the hydraulic symbol. The upper portion of this figure represents the hydraulic symbol; a first operating position of the changeover valve is shown underneath the hydraulic symbol, and a second operating position of the changeover valve is shown in the bottom portion of this figure. FIG. 3 shows the valve unit according to FIG. 2 with the changeover valves 19 and 19'. In the schematic diagram according to FIG. 2, these two valves were illustrated separately in order to elucidate their function, whereas here these two valves are rigidly coupled to one another via a rod 81.

The changeover valves 19 and 19' are actually realized in such a way that the control pistons of both valves are advantageously combined into one control piston 83 that is guided in a cylindrical bore 85 against the force of a spring 87. A magnetic device M2 acts against the spring. Various grooves that are identified by reference numerals and represent the inputs and outputs of the changeover valves 19 and 19' are arranged in the wall of the bore 85. The upper connections of the changeover valve 19 are identified by reference numerals 1 and 3, and the upper connections of the changeover valve 19' are identified by reference numerals 4 and 6. The lower connections of the changeover valve 19 are identified by the tank symbol and reference numeral 2, and the lower connections of the changeover valve 19' are identified by the tank symbol and reference numeral 5.

The corresponding hydraulic connections lead through the wall 89 of the housing of the changeover valve which is not illustrated in detail in this figure.

In the upper portion of this figure, the control piston 83 is deactivated. This means that the magnetic device M2 is not activated such that the spring 87 is able to move the control piston 83 to the left. The control piston is provided with control surfaces that are limited by control edges and connect or disconnect the annular grooves 91 that serve as supply and discharge grooves as a function of the position of the control piston.

In the operating position of the control piston 83 shown in the upper portion of FIG. 3, the connections 3 and 2 of the changeover valve 19 are interconnected, as are connections 6 and 5 of the changeover valve 19'. The connection 1 and the connection 4 are simultaneously connected to the tank. Consequently, the hydraulic connections practically extend linearly in both changeover valves 19 and 19'.

Once the magnetic device M2 is activated, the control piston 83 is moved to the right against the force of the spring 87 (see lower portion of this figure) such that the hydraulic connections described below are produced:

In the changeover valve 19, the connection 3 is connected to the tank, and the connections 1 and 2 are connected together. In the changeover valve 19', the connection 6 is connected to the tank, and the connections 5 and 4 are connected together. This is indicated by intersecting arrows in the hydraulic symbol shown in the upper portion of FIG. 3. Consequently, it is ensured that the connections of both pressure chambers 29 and 31 and $_{29}$' and 31', respectively, are interchanged once the changeover valve responds. This causes opposite moments to be introduced into the corresponding stabilizer section via the hydraulic devices 3 and 3', respectively.

In order to detect the position of the control piston 83 of the changeover valves 19 and 19' which are coupled via the rod 81, an electric or electronic detection device 90 that determines its travel may be provided. In the embodiment shown in FIG. 3, the detection device is arranged within the region of the bore 85 at its right end. The tank pressure acts on the right end of the bore 85. The maximum travel of the control piston is indicated by reference designator Y. The control piston 83 is displaced to the right once the magnetic device M2 is activated. The travel or the instantaneous position of the control piston is determined by means of a suitable sensor arrangement, e.g., a piezoelectric sensor. The detection device makes it possible to determine the instantaneous position of the control piston arranged inside a housing at any time. Due to this direct determination of the control piston position, a jammed control piston can be detected and displayed. The detection device 90 transmits this in the form of an electronic signal, e.g., to the control device 41. After activating the solenoid, the control device assumes that the control piston is situated in its control position. This improves, in particular, the operational reliability of the devices 1 and 1'.

The previous explanations make it clear that the displacement detection device 90 shown in FIG. 3 may also be utilized for the safety valves 21 and 21'.

FIG. 4 shows the safety valves 21 and 21' which are illustrated in FIG. 2. A rod 92 that rigidly couples both control pistons is also provided in this case in order to connect the two safety valves.

Such a safety valve is advantageously realized as shown in the two lower portions of FIG. 4. A continuous piston 93 is accommodated in a cylindrical bore 95. Annular grooves 97 that cooperate with not shown hydraulic connections are arranged in the wall of this bore. The piston 93 comprises control collars and control edges which correspondingly connect the annular grooves to one another.

The annular grooves 97 are assigned to the connections of the safety valves which are identified by reference numerals in this figure. The safety valve 21 contains two upper connections 2 and 4 and two lower connections 1 and 3. The safety valve 21' contains an upper connection 6 and two lower connections 5 and 7, wherein the connection 7 is connected to the tank as indicated by the tank symbol.

In this case, the safety valve contains a magnetic device M1 that acts on the piston 93. Once the magnetic device M1 is activated, the piston is displaced to the right against the force of a spring 99. In the upper schematic diagram, the piston 93 is illustrated in its deactivated position. This means that no current flows through the magnetic device M1, i.e., the spring 99 is able to press the piston 93 to the left. The schematic diagram according to FIG. 4 shows that the connections 1 and 2 as well as the connections 3 and 4 are disconnected in this operating position. This is illustrated in the safety valve 21 of this figure. The connections 6 and 5 are simultaneously disconnected, and a hydraulic connection between the connections 7 and 6 is produced. In the activated state of the safety valve, the magnetic device M1 presses the piston 93 to the right against the force of the spring 99 such that a connection between the connections 1 and 2 as well as the connections 3 and 4 of the safety valve 21 is produced. The connections 7 and 6 are simultaneously disconnected, and a hydraulic connection between the connections 6 and 5 of the safety valve' 21' is produced.

The previous explanations makes it clear that the safety valves 21 and 21' as well as the changeover valves 19 and 19' may be combined and have the same piston. However, this applies only to the mutual combination of the changeover valves and the mutual combination of the safety valves. The changeover valves are not coupled to the safety valves such that the changeover function and the safety function are separated. Consequently, a malfunction of the changeover valve cannot negatively affect the functional reliability of the safety valves.

The previous explanations make it clear that the described devices may be utilized in motor vehicles with two axles, in particular, passenger cars, as well as vehicles with only one axle that carries at least two wheels, e.g., so-called trikes. In addition, the described devices may also be utilized in multiaxle motor vehicles.

FIG. 5 shows a hydraulic diagram of one embodiment of the device 1' for reducing the rolling tendency of a motor vehicle with two axles. Components that correspond to those shown in FIG. 2 are identified by identical reference symbols, i.e., refer to FIG. 2 for a detailed description of these components. The following description pertains only to the differences between these two figures. The hydraulic diagram according to FIG. 5 shows a flow divider 53a that comprises a flow regulator 55a arranged in the fluid path between the pump 11 and the hydraulic device 3' assigned to the rear axle. The flow regulator 55a is connected to the pressure outlet 59 of the pump 11 via a hydraulic line 118, a nozzle DÜ1 that serves as a hydraulic resistance and a line section 120. The flow regulator is also connected to the hydraulic line 13' that supplies the hydraulic device 3' via a line section 122. The flow regulator 55a that is illustrated in the unpressurized state of the pump 11 contains a control piston 63. Pressure respectively acts on both end surfaces of this control piston. One end surface of the control piston 63 is charged with a pressure that—viewed in the flow direction of the fluid—is obtained from the hydraulic line 118 behind the nozzle DÜ1. The other end surface of the control piston 63 is connected to the hydraulic line 13 that supplies the hydraulic device 3 assigned to the front axle with pressurized hydraulic oil via control lines 126 and 128. The hydraulic line 13 is connected to the pressure outlet 59 of the pump 11 via a nozzle DÜ2 and a line section 130. Once the pump 11 is activated, the pressures applied to the end surfaces of the control piston 63 are compared via the control piston 63. If the pressure in the control line 124 is higher than the pressure in the control line 126, the control piston 63 is displaced to the right. Due to this displacement of the control piston 63 to the right, a fluid connection between the pressure outlet 59 of the pump 11 and the hydraulic line 13' is produced. As described above, this makes it possible to apply a torque onto the roll stabilizer of the rear axle. The hydraulic line 13 is decoupled from the flow regulator 55a and continuously supplied with hydraulic oil. If the pressure in the control line 126 is higher than the pressure in the control line 124, the control piston 63 is displaced to the left into its control position and the pressure outlet 59 is disconnected from the hydraulic line 13'.

The pressure in the hydraulic lines 13 and the pressure in the section of the hydraulic line 118 which lies behind the nozzle DÜ1 and leads to the rear axle are approximately identical. If the pressure drop behind the nozzle DÜ2 is more intense than that behind the nozzle DÜ1 at a certain volume flow, the flow regulator 55a is activated in such a way that more fluid flows to the rear axle and less fluid flows to the front axle. If the pressure behind the nozzle DÜ2 is higher than the pressure behind the nozzle DÜ1, the control piston of the flow regulator 55a is activated in such a way that the hydraulic device 3 assigned to the front axle receives more fluid than the hydraulic device 3' assigned to the rear axle. The pressure drop within the region of the nozzles and consequently the division ratio of the fluid flows can be adjusted via the resistance of the individual nozzles. If a pressure higher than that in the hydraulic line 13 is adjusted in the hydraulic line 13' during the operation of the device 1', the flow regulator 55a opens and the division of the fluid flows is carried out only as a function of the nozzle cross sections and the pressures of the front and rear axles. In this case, the fluid flow to the front axle, i.e., to the hydraulic line 13, is increased in comparison to the controlled flow volume to the extent to which the rear axle pressure, i.e., the pressure in the hydraulic line 13', exceeds the front axle pressure. Thus, an improved dynamic response of the front axle is attained that aids in restoring the system to its control state.

The right end surface of the control piston 63 of the flow regulator 55a may, in addition to the pressures exerted via the control line 126, also be charged with the force of a spring 65 indicated by broken lines. In the embodiment of the device 1' shown in FIG. 5, the spring 65 presses the control piston 63 to the left, i.e., in the direction of its control position. Consequently, the control piston 63 is only moved out of its control position and completely opened once the pressure behind the nozzle DÜ1 is higher than the force exerted upon the right end surface by the spring 65 and the pressure in the control line 126. The spring 65 may also be arranged on the opposite end surface of the control piston 63, i.e., on the side on which the control line 124 exerts a pressure on the control piston. In this case, the control piston is moved out of its control position and completely opens the fluid path between the hydraulic line 118 and the line section 122 if the sum of the forces acting on the left end surface of the control piston, i.e., the spring force and the pressure behind the nozzle DÜ1, is higher than the compressive forces acting on the right end surface of the control piston that are obtained behind the nozzle DÜ2. Once the control piston is moved out of its control position and has completely opened the fluid path between the hydraulic line 118 and the hydraulic line 13', the fluid flow conveyed by the pump is divided only as a function of the nozzle cross sections and the pressures acting on the front and rear axles.

In another embodiment of the flow divider 53*a*, a pressure relief valve 69 that is also referred to as a pressure pilot may be provided. This pressure relief valve is connected to the pressure outlet 59 of the pump 11 via a control line 132, the control line 128, from which the control line 126 branches off, a nozzle DÜD, the nozzle DÜ2, and the line section 130. This pressure relief valve 69 is realized analogously to the pressure relief valve shown in FIG. 2 and also contains a ball 75 that is pressed against a valve seat 79 by means of a spring 77. As soon as an overpressure that exerts a force greater than that defined by the spring 77 on the ball 75 is built up in the control line 132, the ball 75 is lifted off the valve seat 79 such that hydraulic fluid is able to flow to the tank 15. If the hydraulic line 13 is blocked due to a malfunction, e.g., jamming of the pressure regulator 43, the hydraulic oil cannot be discharged, but rather flows into the tank 15 via the nozzle DÜ2, the nozzle DÜD, the control lines 128 and 132 and the pressure relief valve 69. This means that the pressure limited by the pressure relief valve 69 acts on the right end surface of the control piston 63. The nozzle cross sections of the nozzles DÜ1 and DÜ2 are very large in comparison to the cross section of the nozzle DÜD., i.e., the hydraulic resistances are comparatively small. The pressure obtained behind the nozzle DÜ1 acts on the opposite end surface of the control piston. Due to the smaller pressure drop—in comparison to the higher pressure drop caused by the nozzles DÜ2 and DÜD on the other side of the control piston—adjusted behind the nozzle DÜ1, the control piston 63 opens the connection between the line section 118 and the line section 122. The differential pressure is preferably so high that the control piston moves into the open position and only a small quantity of oil flows into the tank via the pressure relief valve 69 as the control oil quantity while the majority of the flow volume conveyed by the pump 11 is able to flow to the hydraulic device 3' via the flow regulator 55*a*. Consequently, the pressure regulator 43' may also fulfill the function of the pressure regulator 43.

In another embodiment of the flow divider 53*a*, a valve unit 112 that, for example, is realized in the form of a mechanical return valve may be provided. This valve unit produces a connection between the hydraulic line 13 and the hydraulic line 131. The valve unit 112 prevents the pressure in the hydraulic line 13' from becoming significantly higher than that in the hydraulic line 13 of the front axle. The valve unit 112 contains a ball 116 that adjoins a valve seat 114. The ball 116 may—as indicated by the broken lines—be pressed into the valve seat 114 by a spring. This spring increases the permissible pressure in the hydraulic line 13'. The spring provides the advantage that the valve unit 112 does not permanently respond and begin to vibrate such that increased wear of the valve unit would result, for example, when driving straight forward, in which case minimal and practically almost identical pressures exist in the hydraulic lines 13 and 13'. The spring is preferably designed in such a way that the ball is only lifted off the valve seat at a defined differential pressure.

FIG. 5 also shows a throttle D3 that is arranged in the safety valve 21 and produces a connection between the two pressure chambers of the hydraulic device 3 in the deactivated state of the safety valve. Consequently, a damped overflow of the hydraulic oil from one pressure chamber into the other pressure chamber is possible in this position of the safety valve. This measure increases the driving stability in case of a malfunction.

FIG. 6 shows a hydraulic diagram of one additional embodiment of the device 1' for preventing the rolling tendency of a motor vehicle with at least two axles that respectively carry at least two wheels. The device 1' shown in FIG. 6 differs from the device shown in FIG. 5 due to the fact that the valve unit 112 is replaced with a pressure regulator 134. Due to the utilization of a pressure regulator instead of a return valve, the pressure in the hydraulic line 13' is prevented from becoming higher than the pressure in the hydraulic line 13. The pressure regulator is realized in the form of a so-called single-edge slide, i.e., this pressure regulator comprises only one control edge or one seat. Once this pressure regulator is activated or displaced, the hydraulic oil is able to flow from the hydraulic line 13' into the tank 15. The pressure in the hydraulic line 13' which is obtained via a control line 136 acts on the right side of the pressure regulator 134 and its slide, respectively. The pressure obtained from the hydraulic line 13 via a control line 138 acts on the left side of the pressure regulator 134. A spring 140 may—as indicated—be selectively arranged on either side of the pressure regulator 134. In the embodiment shown in FIG. 6, the spring 140 is arranged on the right side of the pressure regulator 134. Thus, it is ensured that the pressure regulator 134 produces a fluid connection between the hydraulic line 13' and the tank 15 as soon as the pressure in the hydraulic line 13 becomes lower than the sum of the forces exerted by the spring 140 and the pressure in the control line 136. In this case, the spring, similarly to the spring 77 of the pressure relief valve 69, ensures that the pressure regulator 134 does not continuously respond and practically opens and closes the fluid connection in uninterrupted fashion, for example, when the motor vehicle is driven straight forward. Consequently, vibrations of the pressure regulator 134 are practically eliminated.

The upper portion of FIG. 7 shows a hydraulic symbol of the pressure regulator 134 described previously with reference to FIG. 6. There are various options for realizing the pressure regulator 134 in such a way that it produces a-connection between the hydraulic line 13' and the tank 15 if the pressure in the hydraulic line 13' reaches a higher value than the pressure in the hydraulic line 13. The left portion of FIG. 7 shows one embodiment of the pressure regulator 134. The pressure regulator 134*a* contains a control slide 142*a* that is movably arranged in a bore 144. A first pressure chamber 146 is limited by a wall 145 of the pressure regulator housing and the left end surface of the control slide 142*a*. The control line 136 that obtains the pressure from the hydraulic line 13' ends in this first pressure chamber. A second pressure chamber 148 is limited by the right end surface of the control slide and the wall 145, wherein the pressure of the hydraulic line 13' acts on the second pressure chamber via the control line 138. In addition, one respective hydraulic resistance W1 and W2, e.g., nozzles, is arranged in the control lines 136 and 138. These hydraulic resistances serve for damping purposes. The hydraulic line 13' ends in the bore 144, namely in a region in which the control slide is provided with an incision. In the position of the control slide 142*a* shown, the control slide is located in the control position. As soon as the sum of the forces acting on the left end surface of the control slide during the operation of the pump, i.e., the compressive forces and the spring force generated by the spring 140, become higher than the compressive forces acting on the right end surface of the control slide in the second pressure chamber 148, the control slide 142a is displaced to the right and produces a fluid connection between the hydraulic line 13' and the tank 15. The control slide 142a is provided with a control surface that is limited by a control edge 149. This control edge separates the annular groove that is arranged in the bore 144 and leads to the tank from the annular groove, in which the hydraulic line 13' ends.

The central portion of FIG. 7 shows an additional embodiment of the pressure regulator 134. The pressure regulator 134b contains a control slide 142b that—in contrast to the control slide 142a—is not provided with an incision. In this case, the hydraulic line 13' ends directly in the first pressure chamber 146 that is disconnected from the tank 15 by the control slide 142b and the control edge 149, respectively. The second pressure chamber 148 is connected to the hydraulic line 13 via the hydraulic resistance W2 and the control line 138. In this embodiment, the control slide also produces a fluid connection between the hydraulic line 13' and the tank 15 if the forces acting on the right end surface of the control slide become lower than the forces acting on its left end surface which are composed of the force of the spring 140 and the compressive forces in the hydraulic line 13'.

The right portion of FIG. 7 shows an additional pressure regulator 134c that comprises a control slide 142c, the end surface areas of which are different. The pressure applied to the pressure chambers 146 and 148 acts on these surfaces. The end surface 150 of the control slide which faces the second pressure chamber 148 has a smaller cross-sectional surface area to be acted upon by the compressive forces than does the end surface 152 that faces the first pressure chamber 146. The pressure regulator 142c is preferably realized in such a way that it produces a fluid connection between the first pressure chamber and the tank if the pressure in the hydraulic line 13' becomes higher than a factor<1 multiplied by the pressure in the hydraulic line 13 minus the pressure that corresponds to the spring force. It becomes clear that if the pressures in the hydraulic lines 13 and 13' are identical, the control slide is displaced in the direction of the side with the lower pressure level due to the different end surface areas of the control slide. At a surface ratio of 1:1, the spring 140 produces an imbalance of forces, a so-called offset.

This valve arrangement makes it possible to adjust the pressure of the hydraulic device 3' of the rear axle and consequently the torsional moments of the corresponding stabilizer sections as a function of the pressure of the hydraulic device 3 and consequently its torsional moments with only one electrically controlled valve (pressure regulator 43). It is thus possible to make the hydraulically effective surfaces of both oscillating motors identically large and still adjust a lower pressure and consequently lower torsional moments on the rear axle.

In addition, a flow volume that can be exactly defined by the flow divider 53, 53a and is not dependent on the operating pressure of the pump is available for the front and rear axle. This volume flow determines the dynamic of both hydraulic circuits and, due to its constant level, ensures a stable control behavior.

FIG. 8 shows a hydraulic diagram of an additional embodiment of the device 1' for reducing the rolling tendency of a motor vehicle with at least two axles that each carry at least two wheels. Components that correspond to those described with reference to the previous figures are identified by identical reference symbols, i.e., refer to the previously described figures for a detailed description of these components. The flow divider 53a differs from the flow divider illustrated in FIG. 6. In this case, the pressure regulator 43', that limits the pressure in the hydraulic line 13' to a defined value, as well as the pressure sensor 49' is not required. The pressure regulator 134 is directly connected to the hydraulic line 13 via the control line 138. The pressure in the hydraulic line 13' which, if so required, is boosted by the force of a spring acts on the opposite side of the pressure regulator 134 via the control line 136. The pressure regulator may be realized in accordance with one of the pressure regulators a, b or c described previously with reference to FIG. 7. The control piston 63 of the flow regulator 55a is charged with a pressure that is obtained behind the nozzle D Ü1. The pressure in the control line 124 acts in the direction of the open position. A pressure that is obtained from the hydraulic line 13 via the control line 128 acts on the other side of the control piston. These compressive forces which act upon the control piston 63 may be boosted by a spring 65.

FIG. 9 shows a hydraulic diagram of an additional embodiment of the device 1' which differs from the embodiment of the device shown in FIG. 8 due to the fact that the flow divider 53a also contains the pressure relief valve 69 that obtains the pressure from the hydraulic line 13 via the control line 132 and the nozzle DID. In addition, a pressure that is—viewed in the flow direction of the hydraulic oil—obtained behind the nozzle DÜD via a control line 138' acts on the pressure regulator 134. The function of the flow divider according to FIG. 9 is described in detail below:

If the pressure in the hydraulic line 13 increases due to a malfunction, e.g., a defect of the pressure regulator 43, the control piston 63 of the flow regulator moves into the open position, wherein the pressure in the hydraulic line 13' is reduced by the pressure regulator 134. The pressure in the hydraulic line 131 is then adjusted in a certain ratio, e.g., with offset, in accordance with the design of the pressure regulator 134 (compare to the embodiments of the pressure regulator described previously with reference to FIG. 7). In other words, this pressure is adjusted with an imbalance of the pressures in the hydraulic lines or control lines 138' and 136 which is caused by the spring force. In this case, the pressure in the line 138' is limited by the pressure relief valve 69.

The flow dividers 53 and 53a according to the invention preferably provide the front axle with a higher pressure than the rear axle in order to improve the driving stability. Consequently, it is possible to advantageously utilize a flow regulator 55a that comprises only one control edge which closes or opens a fluid path due to its displacement. A flow regulator 55a of this type is less susceptible to vibrations than a classic flow divider with two control edges, in particular, if the pressures acting on of the front axle and the rear axle are approximately identical. A classic flow divider with two control edges may be utilized instead of the single-edge flow divider described in the figures as long as correspondingly arranged limit stops ensure that only one control edge, i.e., the control edge assigned to the rear axle, is able to open a fluid path and the other control edge assigned to the front axle cannot completely close. The sensitivity of the two-edge flow divider to vibrations is thereby reduced.

The flow regulators 55 and 55a differ due to the fact that the flow regulator 55 provides a constant flow volume for the front axle while only the remainder of the hydraulic oil conveyed by the pump reaches the rear axle. In this case, both flow volumes may be identical if-the pump delivers a constant flow volume. However, the division ratio of the flow regulator 55a remains constant. The flow regulator ensures that the flow volume delivered by the pump is always divided in the same ratio such that the hydraulic oil is always uniformly delivered to the front and rear axle and respectively to the hydraulic devices 3 and 3' in the predetermined division ratio.

FIG. 10 shows a basic diagram of a sensor 160 with a slide 162 that is guided in a bore 164. A first chamber 168 is limited by a wall 166 and the left end surface of the slide 162. A second chamber 170 is limited by the right end surface of the slide and the wall. The first chamber 168 is connected, for example, to the fifth line section 35 (compare to FIG. 2) via a line section 172, and the chamber 170 is connected to the second line section 25 (see FIG. 2) via a line section 174. The sensor 160 may be arranged at any location inside of the device 1 or 1' at which a differential pressure must be determined. Two springs 176 and 178 act upon both end surfaces of the slide 162, wherein said springs hold the slide in its central position—as shown in FIG. 10. The slide 162 contains one respective pin 180 on each of its end regions, wherein one respective sealing disk 182 is movably arranged on each pin. The sealing disks 182 define the central position of the slide 162. The maximum travel of the slide 162 is identified by the reference symbol X and defined by the length of the pins. The left and the right end positions of the slide 162 are defined by the pins 180 that serve for limiting the travel of the slide and their respective lengths. In the end positions of the slide, one of the pins contacts the wall 166 of the housing, i.e., the wall 166 serves as a limit stop.

The slide that is preferably located in a stable central position may—according to the embodiment shown in FIG. 10—be displaced to the left and the right by a travel of X/2. Due to the springs 176 and 178, the slide 162 is only moved out of the central position if the pressure in one of the chambers is higher than the pressure in the other chamber by a certain amount. For example, if the pressure in the first chamber 168 is higher than the pressure in the second chamber 170, the slide 162 is displaced to the right and vice versa. This displacement is, for example, detected by means of a wire 186 that engages into an annular groove 188 arranged in the slide 162 and is correspondingly displaced. A schematically illustrated electric or electronic detection device 184 converts this displacement into an electric signal that, for example, is sent to the control device 41 of the device 1 and 1', respectively. The sensor 160 is utilized for comparing two pressures to one another. The sensor may, for example, be used for testing the function of the safety valve and/or the changeover valve. Since the changeover valve and the safety valve are arranged inside a housing and the position of their control pistons cannot be visually ascertained from the outside, the sensor is able easily to determine and, if so required, directly to display these positions. The positions of the slide 162 may, for example, be assigned to the individual driving directions of the motor vehicle. It would be conceivable to assign the central position to the straight forward mode, the position assumed after a displacement of the slide to the right to the right curve mode and the position assumed after a displacement of the slide to the left to the left curve mode.

According to another embodiment of the sensor 160, two pressure switches are provided instead of the slide 162. These pressure switches send a signal, for example, to the control device 41 as soon as a preferably adjustable threshold pressure is reached in one of the lines 172 and 174. The pressure switches may be respectively connected to one hydraulic line or one control line. However, it would also be conceivable to arrange the pressure switches directly inside of a line, a chamber or a pressure chamber in which pressurized hydraulic oil is located.

FIG. 11 shows a basic diagram of an additional embodiment of the sensor 160 which differs from the sensor shown in FIG. 10 due to the fact that the sealing disks 182 as well as the spring 176 are eliminated. The slide 162 may then—as shown in FIG. 11—have a preferred position; this means that the slide is situated in its left end position in which the pin 180 adjoins the wall 166. The slide 162 assumes this preferred position and end position, respectively, in the unpressurized state and in instances in which the pressure in the first chamber 168 is lower than the sum of the compressive forces in the second chamber 170 and the compressive force generated by the spring 178. Alternatively, it would also be possible to eliminate the spring 178 and provide the spring 176 such that the preferred position of the slide 162 corresponds to its right end position.

I claim:

1. A device for reducing the rolling tendency of a motor vehicle with at least one axle that carries at least two wheels, wherein said axle is provided with a roll stabilizer that includes two stabilizer sections which can be turned relative to one another with the aid of a hydraulic device controlled by an electronic control device, with at least one pump that supplies the hydraulic device, and with a valve unit that cooperates with the hydraulic device and influences the turning direction as well as the coupling of the stabilizer sections, and wherein the valve unit contains a changeover valve and a safety valve that can be activated independently of the changeover valve.

2. A device according to claim 1 wherein the changeover valve comprises a 4/2 directional control valve.

3. A device according to claim 1 wherein the safety valve connects the hydraulic device to the pump in a first functional position, and wherein the safety valve causes a rigid or damped coupling of the stabilizer sections or a decoupling of the stabilizer sections in a second functional position.

4. A device according to claim 1 wherein the safety valve represents the last functional element in the hydraulic supply of the hydraulic device.

5. A device according to claim 1 wherein the changeover valve and the safety valve can be electromagnetically activated.

6. A device according claim 5 wherein the changeover valve and the safety valve has a preferred position.

7. A device for reducing the rolling tendency of a motor vehicle with at least two axles that respectively carry at least two wheels, wherein each axle is provided with a roll stabilizer that includes two stabilizer sections which can be turned relative to one another with the aid of first and second hydraulic devices controlled by an electronic control device, with at least one pump that supplies the hydraulic devices, and with a valve unit that cooperates with the hydraulic devices and influences the turning direction as well as the coupling of the stabilizer sections, wherein the valve unit contains a changeover valve and a safety valve that can be activated independently of the changeover valve.

8. A device according to claim 7 wherein the changeover valve comprises a 4/2 directional control valve.

9. A device according to claim 7 wherein the safety valve connects the hydraulic device to the pump in a first functional position, and the safety valve causes a rigid or dampened coupling of the stabilizer sections or a decoupling of the stabilizer sections in a second functional position.

10. A device according to claim 7 wherein the safety valve represents the last functional element in the hydraulic supply of the hydraulic device.

11. A device according to claim 7 wherein, the changeover valve and the safety valve can be electromagnetically activated.

12. A device according to claim 7, wherein the changeover valve and the safety valve has a preferred position.

13. A device according to claim 7 wherein a hydraulic line connects the pressure levels generated for the hydraulic devices with a valve unit for producing a hydraulic connection if the pressure acting on the first hydraulic device is lower than the pressure acting on the second hydraulic device.

14. A device according to claim 7, said device including a flow divider for influencing the hydraulic flow that is delivered to the hydraulic devices assigned to the axles by means of the pump, wherein the pump is in the form of a pump with limited volume flow.

15. A device according to claim 7 wherein a flow divider contains a flow regulator that connects the first hydraulic device to the pump in a first functional position wherein a flow regulator connects the second hydraulic device assigned to the to the pump in a second functional position, and wherein the flow regulator supplies the first hydraulic device with a nearly constant oil flow.

16. A device according to claim 7 wherein a flow divider contains a flow regulator that connects the first hydraulic device to the pump in a first functional position, and the flow regulator connects the second hydraulic device to the pump in a second functional position, and wherein the flow regulator supplies the respective hydraulic devices with an oil flow, wherein the ratio of the oil flows is nearly constant.

17. A device according to claim 7 wherein a first pressure regulator is provided in the flow path assigned to the first hydraulic device, and a second pressure regulator is provided in the flow path assigned to the second hydraulic device, and the pressure regulators are coupled together.

18. A device according to claim 7 wherein a hydraulic line connects the pressure levels generated for the hydraulic devices to a valve unit that produces a hydraulic connection if the pressure acting on the first hydraulic device is lower than the pressure acting on the second hydraulic device.

19. A device according to claim 7 wherein the valve unit comprises a spring that presses a ball into a valve seat.

20. A device according to claim 7 wherein throttle devices are assigned to the hydraulic lines.

21. A device according to claim 20 wherein the division ratio can be adjusted as a function of the cross-sectional surface of the throttle devices.

22. A device according to claim 20 wherein the throttle devices convey more fluid to the front axle than the rear axle.

23. A device according to claim 7 wherein the flow regulator comprises a one-sided flow divider with only one control edge.

24. A device according to claim 17 wherein the first pressure regulator and the second pressure regulator are coupled via the flow regulator that is provided with a preferably mechanical pressure pilot that acts as a pressure relief valve.

25. A device according to claim 7 including a pressure regulator that is connected to the first hydraulic line as well as the second hydraulic line includes a control slide, wherein the surfaces of the control slide which are charged with pressure have a different size.

26. A device according to claim 25 wherein the pressure regulator is arranged between the second hydraulic line of the rear axle and the tank in such a way that it fulfills the function of the pressure regulator.

27. A device according to claim 7 wherein a position detector is provided for detecting the position of at least one control piston of at lease one of the changeover valves, the safety valves and a slide.

28. A device according to claim 7 wherein at least two pressure switches are provided in the respective hydraulic lines or control lines.

* * * * *

UNITED STATES PATENT AND TRADEMARK OFFICE
CERTIFICATE OF CORRECTION

PATENT NO : 6,039,326
DATED : March 21, 2000
INVENTOR(S): Ivo Agner

It is certified that error appears in the above-identified patent and that said Letters Patent is hereby corrected as shown below:

Column 19, line 22, after "device" delete "assigned to the".
Column 18, line 44, after "according" insert --to--.
Column 20, line 32, change "lease" to --least--.

Signed and Sealed this

Sixth Day of February, 2001

Attest:

Q. TODD DICKINSON

Attesting Officer

Director of Patents and Trademarks